(12) United States Patent
Mosler et al.

(10) Patent No.: US 9,062,785 B2
(45) Date of Patent: Jun. 23, 2015

(54) VALVE ARRANGEMENT WITH A BASE PART AND AN INSERT PART

(75) Inventors: Lüder Mosler, Duderstadt (DE); Martin Hillmann, Duderstadt (DE)

(73) Assignee: OTTO BOCK HEALTHCARE GMBH, Duderstadt (DE)

( * ) Notice: Subject to any disclaimer, the term of this patent is extended or adjusted under 35 U.S.C. 154(b) by 1052 days.

(21) Appl. No.: 13/101,812

(22) Filed: May 5, 2011

(65) Prior Publication Data
US 2011/0272618 A1 Nov. 10, 2011

(30) Foreign Application Priority Data

May 7, 2010 (DE) .......................... 10 2010 020 068

(51) Int. Cl.
*F16K 27/02* (2006.01)
*F16K 15/20* (2006.01)
*B62D 1/19* (2006.01)

(52) U.S. Cl.
CPC ................ *F16K 15/20* (2013.01); *B62D 1/192* (2013.01); *F16K 27/02* (2013.01)

(58) Field of Classification Search
CPC .......... F16K 15/20; F16K 27/02; B62D 1/192
USPC ................ 251/366, 144, 367, 145, 146, 143; 137/315.11, 315.13, 454.2, 454.6, 137/234.5, 588
See application file for complete search history.

(56) References Cited

U.S. PATENT DOCUMENTS 3,910,550 A * 10/1975 Nelson .......................... 251/144
5,330,154 A * 7/1994 Mashburn et al. ............ 251/144
6,634,396 B2 * 10/2003 Ozawa .......................... 137/588
6,725,726 B1 4/2004 Adolfs et al.

FOREIGN PATENT DOCUMENTS

| EP | 0803225 B1 | 11/2001 |
| WO | 9937983 A2 | 7/1999 |
| WO | 2007001745 A2 | 2/2007 |

* cited by examiner

*Primary Examiner* — John K Fristoe, Jr.
*Assistant Examiner* — Andrew J Rost
(74) *Attorney, Agent, or Firm* — Holland & Hart

(57) ABSTRACT

A valve arrangement includes a base part, having securing means for securing the valve arrangement to a place of use and an axially continuous bore with an inner wall, a valve insert part, which can be inserted with a stub into the bore, sealed by a seal with respect to the inner wall, and having at least one latching element with which the valve insert part can be latched in the inserted and sealed position by elastic engagement over a locking projection in the base part, and on which an actuating element is located for releasing and removing the valve insert part from the base part, and an adjustable valve element, which is mounted in a chamber of the valve insert part having a valve seat and with which a fluid connection all the way through the valve arrangement can be established or shut off.

20 Claims, 5 Drawing Sheets

VALVE ARRANGEMENT WITH A BASE PART AND AN INSERT PART

CROSS-REFERENCE TO RELATED APPLICATION

This application claims priority to German Patent Application No. 102010020068.9, filed 7 May 2010, and entitled VALVE ARRANGEMENT WITH A BASE PART AND AN INSERT PART, the disclosure of which is incorporated, in its entirety, by reference.

TECHNICAL FIELD

The invention relates to a valve arrangement
- with a base part, which has securing means for securing the valve arrangement to a place of use and has an axially continuous bore with an inner wall,
- with a valve insert part, which can be inserted with a stub into the bore, sealed by a seal with respect to the inner wall, and has at least one latching element with which the valve insert part can be latched in the inserted and sealed position, by elastic engagement over a locking projection in the base part, and on which an actuating element is located for releasing and removing the valve insert part from the base part, and
- with an adjustable valve element, which is mounted in a chamber of the valve insert part having a valve seat and with which a fluid connection all the way through the valve arrangement can be established or shut off.

Valve arrangements of this kind can be used in a great many fields of application. By means of the design with a base part and a valve insert part, it is possible for the valve insert part with its valve element to be checked in terms of its function and, if appropriate, cleaned, while the base part serves to hold the easily removable valve insert part and remains secured by the securing means to the place of use. This securing can be made non-releasable, by adhesive bonding, welding or integration, or can be made releasable, for example by screwing. The valve element can perform the function of a safety valve, for example of a pressure relief valve, and can preferably be actuated by hand, for example in order to manually control pressure equalization. Valve arrangement of this kind can therefore be used on all overpressure and underpressure containers, for example also on a pressure cooker.

A preferred use of a valve arrangement according to the invention is envisioned for prosthesis sockets, which serve to receive amputation stumps, so as to ensure that a prosthesis replacing the amputated limb can be secured to the amputation stump. For this case of use, it may be expedient to develop an underpressure between the prosthesis socket and the amputation stump, in order to improve the connection between the amputation stump and the prosthesis socket. In this case, the valve arrangement is usually fitted in a distal portion of the prosthesis socket and performs the function of closing the underpressure space inside the prosthesis socket and of permitting the ventilation of the underpressure space by actuation from the outside, such that, when the prosthesis is to be taken off, the prosthesis socket can be withdrawn from the amputation stump without interference caused by an underpressure. In this case, the valve insert part removable from the base part is particularly advantageous for the user if, for example, a textile stocking used to introduce the amputation stump into the prosthesis socket is pulled over the amputation stump in order to reduce the kinetic friction between amputation stump and prosthesis socket. A free end of the stocking is then pushed through the continuous bore of the base part when the valve insert part has been removed from the base part. After the amputation stump has been introduced into the prosthesis socket with the aid of the stocking, the stocking can be withdrawn from the amputation stump via the end pushed through the bore of the base part and removed from the interior of the prosthesis socket, such that the increased and desired static friction between the amputation stump and the inside wall of the prosthesis socket is now available. It is unimportant here whether the amputation stump is introduced directly into the prosthesis socket or is introduced into the latter while covered by a liner that is adapted to the amputation stump and that has a cushioning action. After insertion of the valve insert part, an underpressure can be generated in the interior of the prosthesis socket via the valve arrangement. For this purpose, the valve element is preferably designed as a check valve, which permits a flow of fluid only in one direction, in order to evacuate the interior of the prosthesis socket, that is to say allows air to pass through the wall of the prosthesis socket only from the interior of the prosthesis socket to the area outside the prosthesis socket. When the prosthesis is to be taken off again, the interior of the prosthesis socket can be ventilated by pressing on the valve element, such that a pressure equalization is possible that allows the prosthesis to be taken off.

BACKGROUND

The valve insert part is usually inserted into the base part by screwing. The valve insert part is screwed with an external thread into an internal thread in the bore of the base part. This has proven difficult, the reason being that although only a small thread pitch has to be provided for the good seal required between the base part and the valve insert part, this thread pitch requires precise screwing of the valve insert part into the base part. This precise screwing cannot be provided with certainty by patients who are expected to carry out this screwing movement with poor visual contact or indeed with no visual contact. Therefore, this screwing is sometimes not possible at all, or it is sometimes possible only with great effort or with the help of a third person.

WO 2007/001745 A2 discloses a threadless valve arrangement in which the valve insert part can be inserted into the base part with the aid of latching elements. The valve insert part in this case has a circular cylindrical stub, which carries an O-ring as seal. This stub can be inserted with a matching fit into the circular cylindrical bore of the base part. On a flange end directed away from the stub, the valve insert part has latching arms designed as two-arm levers which, at their end pointing toward the stub, have a latching rib able to grip behind a locking projection of the base part radially from outside. The movement of the latching arms into the latching position is supported by a helical spring pushed onto a latching pin. At the end of the latching arms directed away from the locking rib, there are actuating projections behind which fingers can be placed in order to press the upper ends of the latching arms radially inward, and thus press the locking ribs radially outward, and release the latching connection between valve insert part and base part, such that the valve insert part can be withdrawn from the base part.

The known valve arrangement permits considerable easier actuation of the valve arrangement for the removal of the valve insert part and for the subsequent insertion thereof into the base part. The valve insert part is in this case complicated to assemble because of the required assembling of the rotation axis, designed as a metal pin, of the latching arms onto which the helical spring designed to function as rotation spring has to be pushed and has to be positioned in a correctly tensioned state of the coil ends relative to the housing of the valve insert part, on the one hand, and to the actuation arm, on the other hand.

SUMMARY

The object of the present invention is therefore to design a valve arrangement of the type mentioned at the outset in such a way that it ensures the achieved operating advantages but is less complicated to produce.

According to the invention, this object is achieved, in a valve arrangement of the type mentioned at the outset, by virtue of the fact that, on the stub of the valve insert part above the seal towards the inner wall of the base part, the at least one latching element is integrally formed radially outside the chamber, forms an elastically resilient arm with a free end and has at least one radially outwardly directed locking rib for engagement with the radially inwardly directed locking projection formed on the inner wall, and by virtue of the fact that the actuating element is located on the free end of the resilient arm for pressing radially inward.

The valve insert according to the invention, which valve insert carries the valve element, is designed in one piece with the elastically resilient arms and can thus be pushed into the continuous bore of the base part. Since the resilient arm has a radially outwardly directed locking rib, this arm can engage with the locking projection of the base part, which locking projection, according to the invention, is designed facing radially inward on the inner wall. For the valve insert part according to the invention, it is therefore no longer necessary to secure actuating arms pivotably with a rotation axis on a flange, since the latching according to the invention is already obtained by resilient locking when the valve insert part is pushed into the base part. The actuating element for releasing the latching provided by the associated arm is located on the free end of the resilient arm. By pressing radially inward on the actuating element, it is possible to release the radially outwardly directed locking rib from the radially inwardly directed locking projection on the inner wall of the bore, such that the valve insert can be removed. The actuating element is preferably designed in one piece with the resilient arm.

In a particularly simple embodiment of the invention, two latching elements are provided, which are each able to move radially and in a resilient manner by means of a slit that is open toward the free end and that is closed toward the stub. The two slits are thus located between a wall of the chamber and the resilient arms mounted on the stub, which is formed in the continuation of the chamber.

Since the locking rib of the latching element is intended, when pushed in, to snap in behind the locking projection on the inner wall, it is expedient if the locking rib has a sawtooth shape, such that it can be easily pushed over the locking projection on the inner wall of the base part, but withdrawal in the opposite direction is not possible because of the sawtooth shape forming a step-shaped edge.

The locking projection on the inner wall of the bore of the base part is expediently provided as a closed ring, which expediently forms a step-shaped edge for engaging with the step-shaped edge of the locking ribs. In an advantageous embodiment, this locking projection delimits an annular circumferential groove with a profile that is sawtooth-shaped in the axial direction and deepens toward the locking projection. The groove thus has a shape complementing the sawtooth shape of the locking rib.

For the patient, introducing the valve insert into the continuous bore of the base part is made much easier by the fact that a portion of the stub of the valve insert part tapers conically with a circular cross section, and the inner wall of the base part has a correspondingly conical shape. In this way, the bore widens in a funnel shape to the end at which the valve insert part is introduced into the base part. For prosthesis wearers in particular, handling of the valve arrangement according to the invention can thus be made considerably easier. The seal is in this case preferably arranged in the conical portion of the stub and of the inner wall.

In the valve arrangement according to the invention, the adjustable valve element can preferably be actuated by pressing from the outer face, where the valve insert is introduced into the base part, in the direction of the stub of the valve insert part, so as to manually bring about a pressure equalization. In a preferred embodiment of the valve arrangement according to the invention, inadvertent actuation of the valve element is avoided by the fact that a cover cap is designed to engage over the actuating elements from radially outside and to cover the valve element. The cover cap covers the valve element and prevents inadvertent actuation, which, for example, could cause the securing of the prosthesis to the amputation stump to be lost. For securing the cover cap on the valve arrangement, no additional locking means or the like are needed, since the cover cap preferably engages over the actuating elements, which are mounted resiliently with respect to each other, that is to say radially inwardly, on the elastically resilient arms, such that the cover cap can be easily locked onto the actuating elements when so required, for which only a slight displacement of the actuating elements in the radially inward direction suffices. However, this slight displacement for locking the cover cap on is not enough to release the valve insert part from the base part.

In a preferred embodiment of the invention, the cover cap is secured fixedly on the base part via the securing means of the base part. The securing means for the base part at the place of use are thus at the same time used to mount the cover cap fixedly on the base part. This is preferably done with a securing ring which is held fixedly on the base part by means of a screw-on nut on a threaded portion of the base part and which leads in one piece with a tangential connecting portion to the one-piece cover cap. The tangential connecting piece can lead in a straight line or also in a spiral shape from the securing ring to the cover cap. Thus, the cover cap that can be mounted fixedly in position can also be designed as a single injection-molded plastic part and does not therefore have to be assembled from a plurality of parts.

The invention is explained in more detail below on the basis of an illustrative embodiment depicted in the drawing, in which:

DETAILED DESCRIPTION

Figure 1:
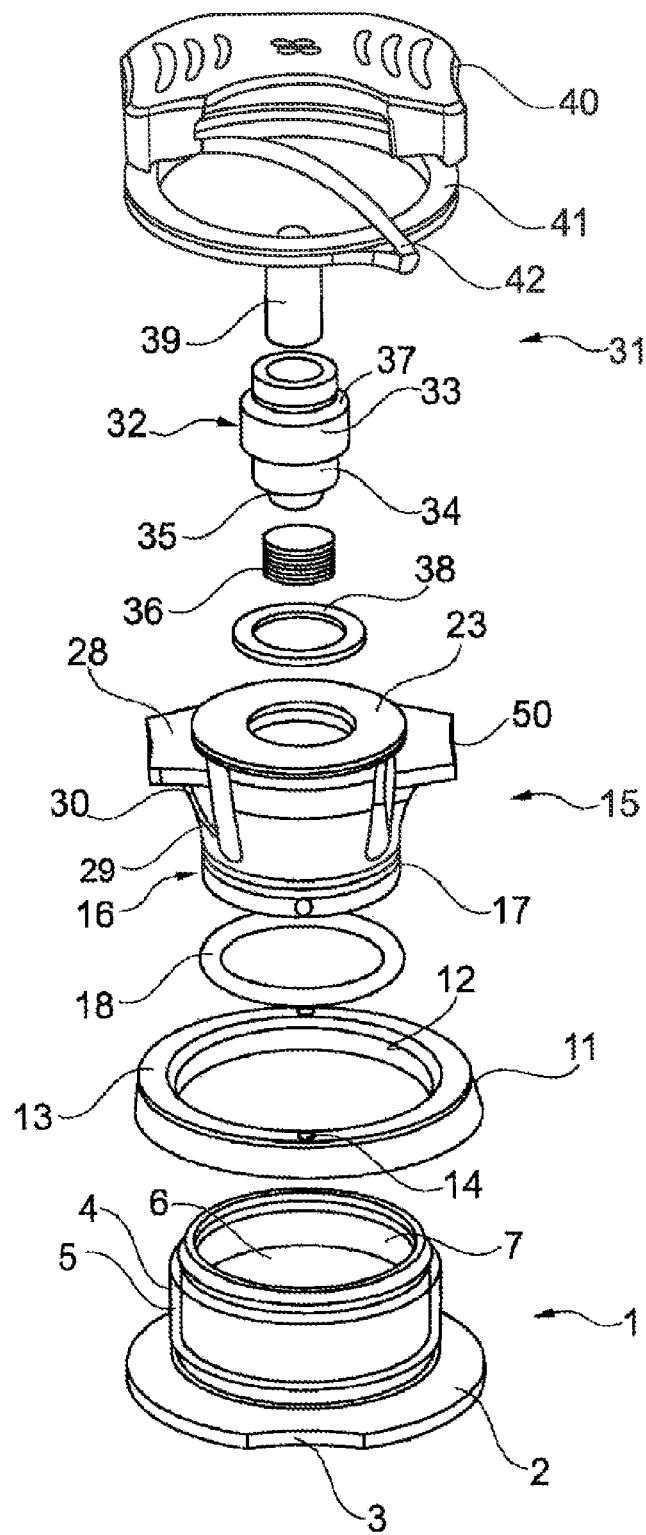
FIG. 1 shows an exploded view of an embodiment of a valve arrangement according to the invention.

As can be seen from FIG. 1, the valve arrangement according to the invention has a base part 1 with, at one end, a circularly widened flange 2, on the outer circumference of which two rectilinear key surfaces 3 are formed. The flange 2 is adjoined by a hollow cylindrical portion 4, which is provided on the outer circumferential surface thereof with an external thread 5. The hollow cylindrical portion 4 contains a continuous bore 6, which is delimited by an inner wall 7.

Figure 2:
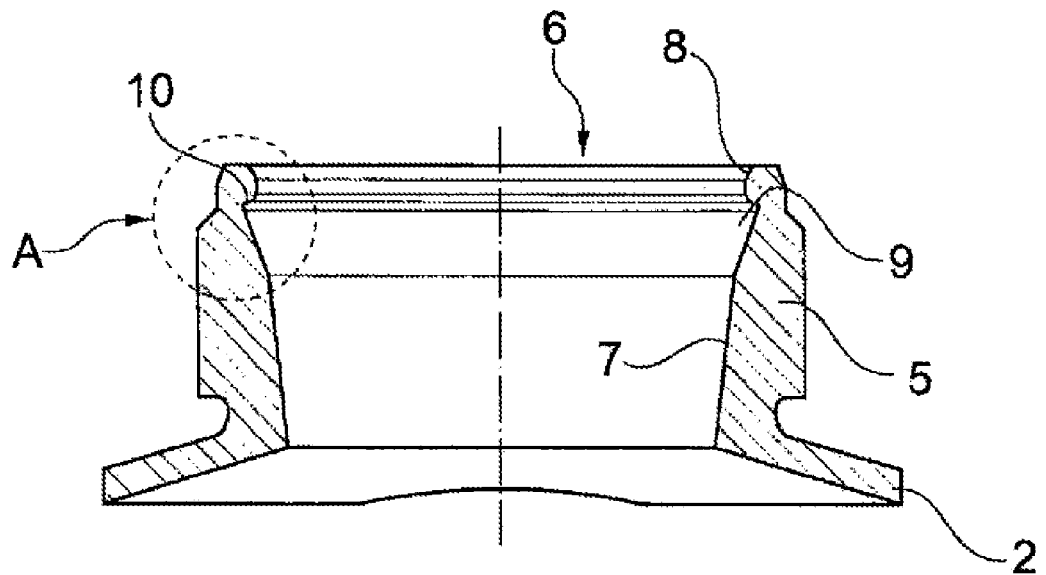
FIG. 2 shows a section through a base part.
Figure 3:
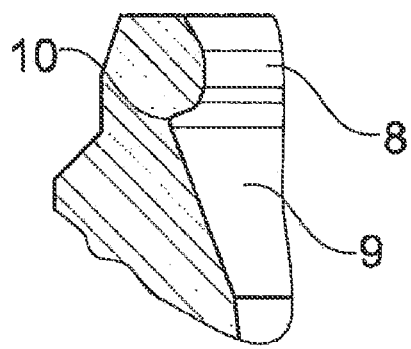
FIG. 3 shows an enlarged view of a detail from FIG. 2.

FIGS. 2 and 3 show that, starting from the flange 2, the inner wall 7 widens conically and, at the end remote from the flange 2, has an annular locking projection 8, which delimits a sawtooth-shaped groove 9. The sawtooth-shaped groove 9 forms, with the locking projection 8, a step-shaped locking edge 2010, as is illustrated in particular in FIG. 3.

A ring nut 11 (FIG. 1), formed in a circle shape with an internal thread 12, engages with the external thread 5 of the base part 1. The internal thread 12 can be screwed onto the external thread 5 of the base part, such that the base part 1 can be fitted into a suitable opening in a wall, where the base part 1 bears with the flange 2 on one side of the wall and with the ring nut 11 on the other side of the wall when the corresponding through-opening in the wall corresponds to the external diameter of the hollow cylindrical portion 4. By tightening the ring nut 11, it is possible to secure the base part 1 with a frictional fit on such a wall. In a preferred illustrative embodiment, the wall can, for example, be the wall of a prosthesis socket.

On its annular end face 13, the ring nut 11 has two diametrically opposite blind holes 14 in which corresponding pins of a tool can engage for tightening the ring nut 11.

Figure 4:
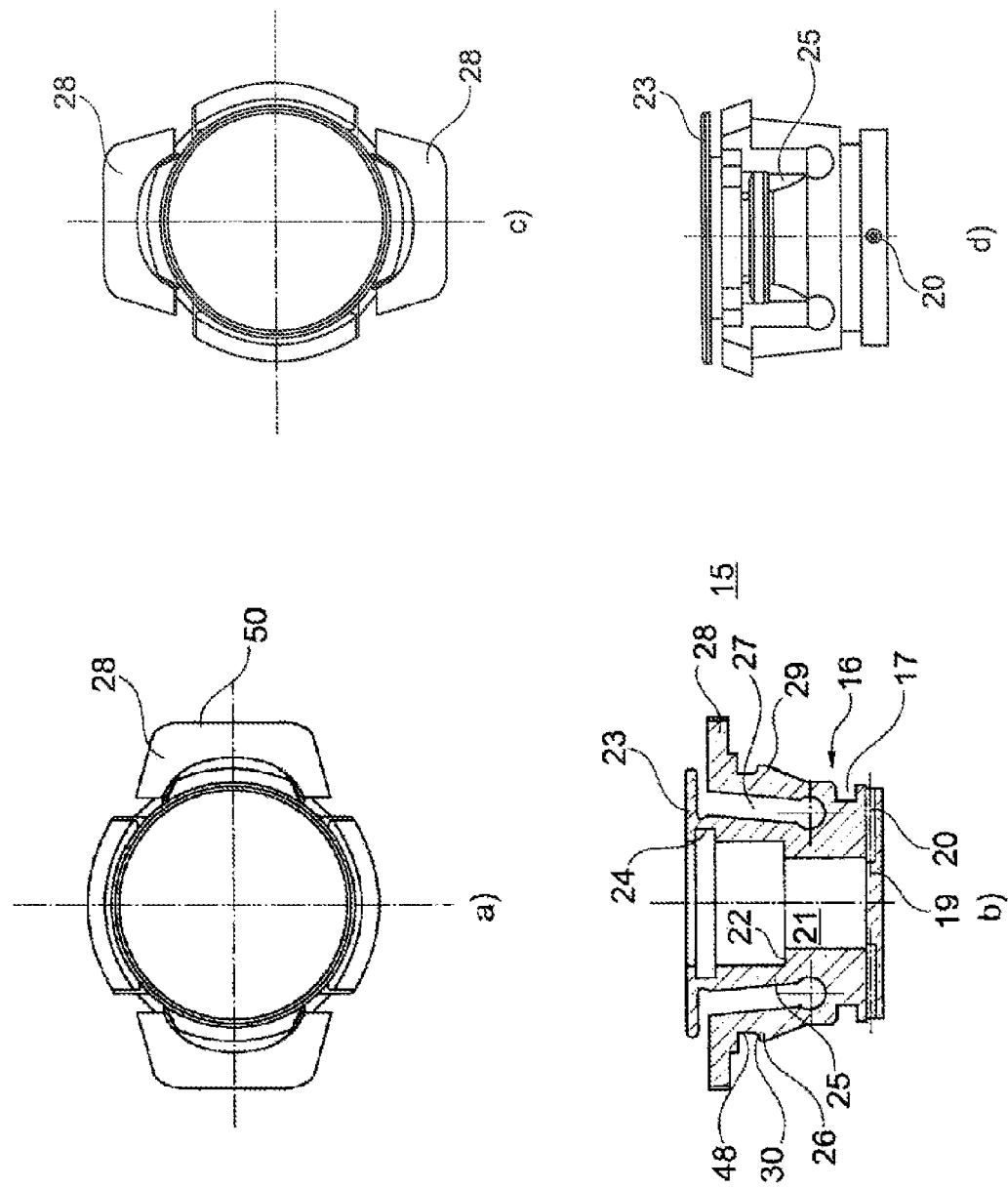
FIG. 4 shows two plan views and two mutually perpendicular sectional views of a valve insert part produced in one piece.

A valve insert part 15 can be inserted into the bore 6 of the base part 1. The valve insert part 15, shown in FIG. 4 in two views from above, in a vertical section and in a side view, is a one-piece injection-molded part. At a lower end, it forms a stub 16 that tapers gently in a conical shape toward the bottom, the conicity of the stub 16 corresponding to the conicity of the inner wall 7 of the base part 1. In the outer circumference of the stub 16, there is an annular groove 17 into which an O-ring 18 (FIG. 1) can be fitted. The stub 16 is closed by a bottom plate 19, in which air channels 20 lying diametrically opposite each other are formed radially. The air channels 20 connect a chamber 21 in the interior of the valve insert part 15 to the environment. The chamber extends, widening in a stepped shape, to an upper annular closure wall 23. Below the closure wall 23, an annular groove 24 is formed in the inner wall of the chamber 21.

The chamber 21 is delimited in the circumferential direction in the valve insert part 15 by a wall 25.

Two diametrically opposite resilient arms 26 extend upward from the stub 16 and are separated from the wall 25 by a vertical slit 27 directed downward at a slight angle, such that the resilient arms 26, on account of their material connection to the material of the stub 16 at the lower end, can move resiliently and laterally toward each other and away from each other. At the upper end of the resilient arms 26, actuating elements 28 are formed which point away from each other and of which the contour form a gently inwardly curved finger depression 50 if the resilient arms 26 are intended to be pressed inward manually into the area of the slits 27.

On their radially outer face, the resilient arms 26 each have a locking rib 29, which has the shape of a saw tooth and is closed to the actuating elements 28 with a step-shaped locking edge 30 adjoined by an annular groove 48.

The sawtooth shape of the locking rib 29 is adapted to the sawtooth-shaped grooves 9 in the inner wall 7 of the base part. The groove 30 serves to receive or engage over the locking projection 8.

Figure 5:
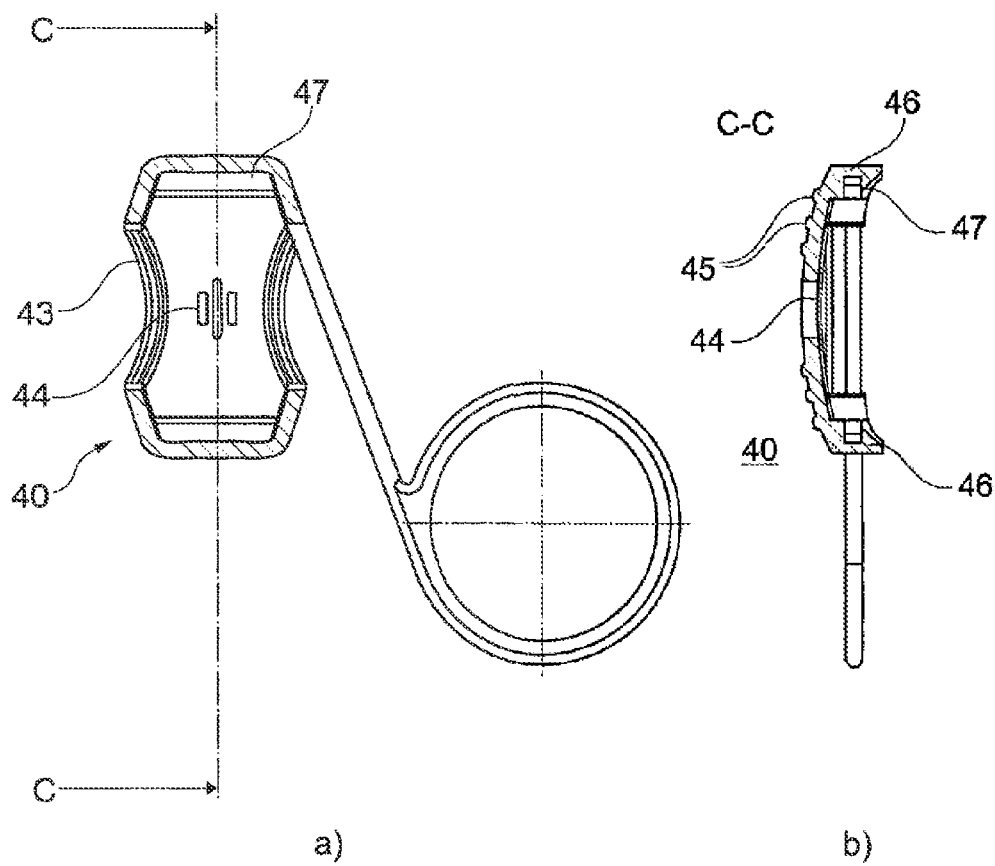
FIG. 5 shows a plan view and a partial section through a cover cap with a securing ring for mounting the cover cap fixedly on the base part.

The chamber 21 of the valve insert part 15 serves to receive a valve element 31. The latter has a cylindrical valve body 32, of which the external diameter is adapted to the two stepped diameters of the chamber 21. The valve body accordingly has a central portion 33 with an external diameter corresponding to the diameter of the step-shaped widening 22 of the chamber 21. This portion is adjoined, in the direction of the bottom plate 19, by a portion 34 with a smaller diameter. A portion 35 having another step-shaped decrease in size serves to receive a compression spring 36, which bears on the bottom plate 19 in the valve insert part and therefore presses the valve body 32 with upwardly directed pretensioning in the view in FIG. 1. The other side of the central portion 33 is adjoined by a valve seat surface 37 which tapers in a curving shape and which comes to bear sealingly on an O-ring 38 placed in the annular groove 24 of the valve insert part 15. Into the inwardly hollow cylindrical valve body 32 is fitted another insert part 39, by which the valve element 31 can be pressed in counter to the force of the compression spring 36. A cover cap 40 engages over the actuating elements 28 and has a suitable elongate shape. It is connected integrally to an intermediate piece 41 and to a securing ring 42 and is produced as a corresponding injection-molded part, as is illustrated in FIG. 5. The securing ring 42 is pushed on the side of the ring nut 11 onto the hollow cylindrical portion 4 of the base part and, with the base part 1 secured to the place of use, is secured fixedly on the base part by tightening the ring nut 12. The intermediate piece 41 is elastically deformable and thus permits removal and attachment of the cover cap 40. For this purpose, the cover cap 40 is turned through 90° in relation to the securing position shown in FIG. 1, such that the elongate ends of the cover cap reach a position extending downward beyond the actuating elements 28. By being rotated through 90°, the cover cap 40 can then cover the actuating elements from above and engage the actuating elements from below, as is illustrated in FIG. 6.

The cover cap 40 shown in FIG. 5 has an elongate shape with a longitudinal direction L and has grip recesses 43 formed on the two long faces. Centrally on the longitudinal axis L, the cover cap 40 is provided with three ventilation slits 44. In relation to the longitudinal axis L, the surface of the cover cap is designed on both sides with grip furrows 45, which are intended to make the cover cap 40 easier to handle. In relation to the longitudinal axis L, end walls 46 provided at both ends of the cover cap 40 protrude from the surface, and a groove 47 extending perpendicular to the longitudinal axis is formed in said end walls 46. The width of the groove corresponds to the material thickness of the planar actuating elements 28, which engage in the grooves 47 when the cover cap 40 is turned, and they can be pressed in slightly toward each other.

Figure 6:
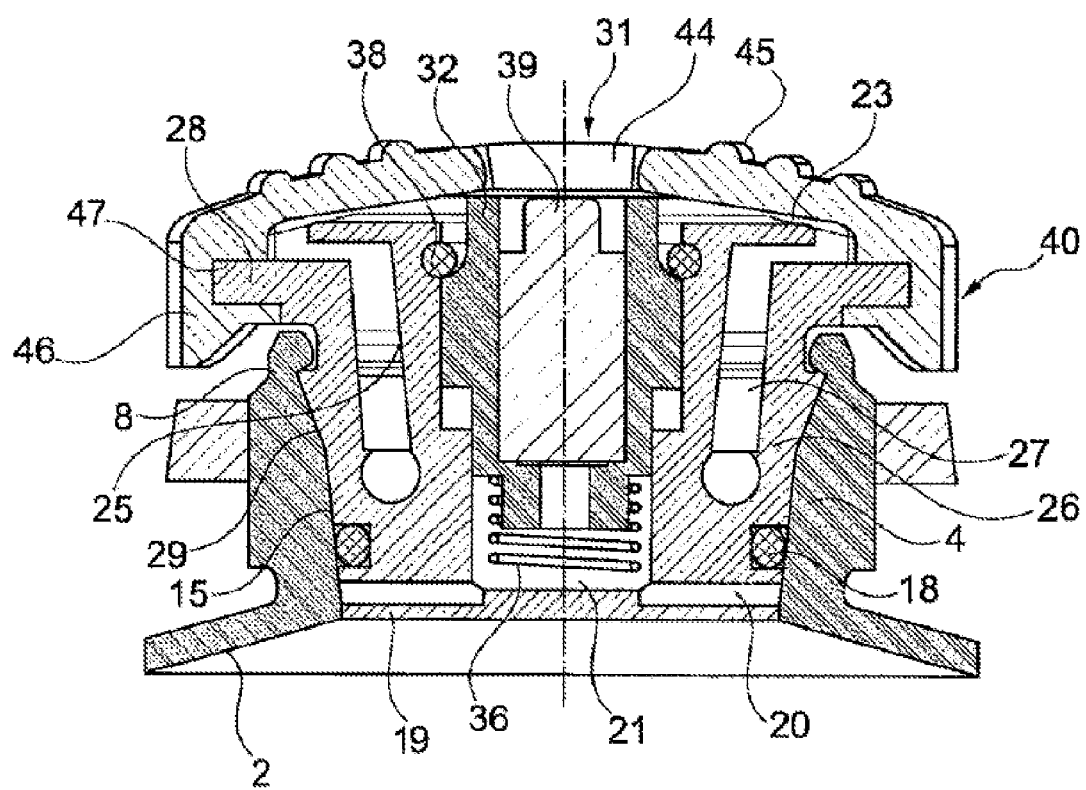
FIG. 6 shows a section through a fully assembled valve arrangement with cover cap.

FIG. 6 illustrates the assembly of the valve arrangement according to FIG. 1. For reasons of clarity, however, the securing of the cover cap by means of the securing ring 42 and of the intermediate piece 41 is not shown.

It will be seen that the valve insert part 15, in the area of the conical stub 8 and of the conical inner wall 7, is sealed with the O-ring 18 in relation to the base part 1.

By contrast, the sealing of the valve element 31 in relation to the valve insert part 15 is effected by the O-ring 38 with the valve seat surface 37 of the valve body 32. By pressing the valve element 31 counter to the restoring force of the compression spring 36, pressure equalization can be performed through the air channels 20 and the chamber 21 of the valve insert part 15.

The insert part 39 also has the effect that, when the valve body 32 is sealed on the O-ring 38, a flow of fluid through the valve element 31 in FIG. 6 can only take place from the bottom upward. If the valve arrangement is mounted on a prosthesis socket in such a way that the flange 2 of the base part 1 is located on the inner faces of the wall of the prosthesis socket, a flow of air through the valve arrangement is thus possible for evacuating the interior of the prosthesis socket.

In order to remove the valve insert part 15 with the valve element 31, the cover cap 40 is turned through 90°, such that the grooves 47 no longer enclose the actuating elements 28. The cover cap 40 can then be let go, since it is left hanging on the valve arrangement by the securing ring. The actuating elements 28 can now be pressed radially inward toward each other, as a result of which the locking ribs 29 come away from the annular locking projection 8, such that the valve insert part 15 can be withdrawn from the bore 6. The bore 6 is then available as an opening for any manual interventions that may be needed.

The valve insert part 15 is inserted into the base part 1 by being pushed in axially until the locking edge 30 of the locking rib 29 snaps in behind the locking edge 10 of the locking projection 8 of the base part and the sawtooth-shaped locking rib 29 bears on the correspondingly sawtooth-shaped groove 9.

Besides the valve element 31, the valve arrangement is formed by four simple injection-molded parts, namely by the base part 1, the ring nut 11, the valve insert part 15 and the cover cap 40 with the intermediate piece 41 and with the securing ring 41.

No assembly work is therefore needed for said parts. The joining together of the valve arrangement at the place of use is extraordinarily easy and merely involves tightening the ring nut 11 on the external thread 5 of the base part 1.

The invention claimed is:

1. A valve arrangement, comprising:
a base part having a securing member for securing the valve arrangement to a place of use and an axially continuous bore with an inner wall;
a valve insert part having a stub and being insertable into the bore, the valve insert part being sealed by a seal with respect to the inner wall, and having at least one latching element with which the valve insert part is latched in an inserted and sealed position by elastic engagement over a locking projection in the base part, and having an actuating element for releasing and removing the valve insert part from the base part;
an adjustable valve element, which is mounted in a chamber of the valve insert part having a valve seat and with which a fluid connection through the valve arrangement is established or shut off,
wherein, on the stub of the valve insert part above the seal towards the inner wall of the base part, the at least one latch element is integrally formed radially outside the chamber, forms an elastically resilient arm and has at least one radially outwardly directed locking rib for engagement with the radially inwardly directed locking projection formed on the inner wall, and the actuating element is located on free ends of the resilient arm for pressing radially inward.

2. The valve arrangement as claimed in claim 1, wherein two latch elements are provided, which are each movable radially and in a resilient manner by operation of a slit that is open toward the free end and that is closed toward the stub.

3. The valve arrangement as claimed in claim 1, wherein the locking rib of the at least one latch element has a sawtooth shape.

4. The valve arrangement as claimed in claim 1, wherein the locking projection of the inner wall forms a closed ring.

5. The valve arrangement as claimed in claim 4, wherein the locking projection delimits an annular circumferential groove with a profile that is sawtooth-shaped in the axial direction and deepens toward the locking projection.

6. The valve arrangement as claimed in claim 1, wherein a portion of the stub of the valve insert part tapers conically with a circular cross section, and the inner wall of the base part has a correspondingly conical shape.

7. The valve arrangement as claimed in claim 6, wherein the seal member is arranged in the conical portion of the stub and of the inner wall.

8. The valve arrangement as claimed in claim 1, wherein a cover cap is designed to engage over the actuating element from radially outside and to cover the valve element.

9. The valve arrangement as claimed in claim 8, wherein the cover cap is secured fixedly on the base part via the securing member of the base part.

10. The valve arrangement as claimed in claim 1, wherein the actuating element is formed in one piece with the resilient arm.

11. A valve arrangement, comprising:
a seal member;
a base part, comprising:
a securing member for securing the valve arrangement to a place of use;
an inner wall;
an axially continuous bore formed in the inner wall;
a locking projection;
a valve insert part having at least one latch element, a chamber, a stub, and an actuating element, the chamber having a valve seat, the valve insert being insertable with the stub into the bore, sealed by the seal member with respect to the inner wall, and latched in position with the at least one latch element by elastic engagement over the locking projection of the base part, the actuating element operating to release and remove the valve insert part from the base part;
an adjustable valve element mounted in the chamber of the valve insert part and configured to establish or shut off a fluid connection through the valve arrangement;
wherein the at least one latch element is integrally formed radially outside the chamber on the stub of the valve insert part at a location above the seal member and towards the inner wall of the base part, and forms an elastically resilient arm, and has at least one radially outwardly directed locking rib for engagement with the radially inwardly directed locking projection formed on the inner wall, and the actuating element is located on free ends of the elastically resilient arm for pressing radially inward.

12. The valve arrangement as claimed in claim 11, wherein the at least one latch element includes first and second latch elements, which are each movable radially and in a resilient manner by operation of a slit that is open toward one of the free ends and is closed toward the stub.

13. The valve arrangement as claimed in claim 11, wherein the locking rib of the at least one latch element has a sawtooth shape.

14. The valve arrangement as claimed in claim 11, wherein the locking projection of the inner wall forms a closed ring.

15. The valve arrangement as claimed in claim 14, wherein the locking projection delimits an annular circumferential groove with a profile that is sawtooth-shaped in the axial direction and deepens toward the locking projection.

16. The valve arrangement as claimed in claim 11, wherein a portion of the stub of the valve insert part tapers conically with a circular cross section, and the inner wall of the base part has a correspondingly conical shape.

17. The valve arrangement as claimed in claim 16, wherein the seal member is arranged in the conical portion of the stub and of the inner wall.

18. The valve arrangement as claimed in claim 11, wherein a cover cap is designed to engage over the actuating element from radially outside and to cover the valve element.

19. The valve arrangement as claimed in claim 18, wherein the cover cap is secured fixedly on the base part via the securing member of the base part.

20. The valve arrangement as claimed in claim 11, wherein the actuating element is formed in one piece with the resilient arm.

* * * * *